US009005082B2

(12) United States Patent
Okamura et al.

(10) Patent No.: US 9,005,082 B2
(45) Date of Patent: Apr. 14, 2015

(54) CONTROL DEVICE AND CONTROL METHOD FOR VEHICLE

(71) Applicants: Koji Okamura, Nukata-gun (JP); Takao Nishimura, Nagoya (JP); Masatomo Yoshihara, Toyota (JP); Fumikazu Satou, Toyota (JP)

(72) Inventors: Koji Okamura, Nukata-gun (JP); Takao Nishimura, Nagoya (JP); Masatomo Yoshihara, Toyota (JP); Fumikazu Satou, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/234,760

(22) PCT Filed: Oct. 26, 2012

(86) PCT No.: PCT/IB2012/002146
§ 371 (c)(1),
(2) Date: Jan. 24, 2014

(87) PCT Pub. No.: WO2013/068800
PCT Pub. Date: May 16, 2013

(65) Prior Publication Data
US 2014/0287873 A1    Sep. 25, 2014

(30) Foreign Application Priority Data

Nov. 10, 2011  (JP) ................................ 2011-246609

(51) Int. Cl.
| | |
|---|---|
| *B60W 10/04* | (2006.01) |
| *B60W 10/18* | (2012.01) |
| *B60W 10/00* | (2006.01) |
| *F02D 41/00* | (2006.01) |
| *B60W 10/06* | (2006.01) |
| *B60W 30/18* | (2012.01) |
| *B60W 30/188* | (2012.01) |
| *B60W 10/11* | (2012.01) |
| *B60W 10/184* | (2012.01) |

(52) U.S. Cl.
CPC ......... *B60W 10/06* (2013.01); *B60W 30/18118* (2013.01); *B60W 30/1884* (2013.01); *B60W 2510/0638* (2013.01); *B60W 2510/1015* (2013.01); *B60W 2520/10* (2013.01); *B60W 2540/10* (2013.01); *B60W 2550/142* (2013.01); *B60W 2710/0644* (2013.01); *B60W 10/11* (2013.01); *B60W 10/184* (2013.01)

(58) Field of Classification Search
None
See application file for complete search history.

(56) References Cited

U.S. PATENT DOCUMENTS

| 6,875,153 | B2 * | 4/2005 | Jager et al. ..................... 477/71 |
| 7,041,031 | B2 * | 5/2006 | Wheeler et al. ............... 477/110 |

FOREIGN PATENT DOCUMENTS

| JP | A-2009-275628 | 11/2009 |
| JP | A-2010-96051 | 4/2010 |
| JP | A-2010-180850 | 8/2010 |
| JP | A-2010-180987 | 8/2010 |

* cited by examiner

*Primary Examiner* — Ramya Burgess
*Assistant Examiner* — Timothy Hannon
(74) *Attorney, Agent, or Firm* — Oliff PLC

(57) ABSTRACT

An ECU increases an engine rotation speed when the ECU determines that an inclination angle of an uphill is larger than or equal to a predetermined value, an accelerator is off and a vehicle speed in a direction opposite to a travelling direction of a vehicle, indicated by a specified range, is increasing. Subsequently, the ECU acquires an engine stall predicted vehicle speed, and calculates a predetermined value used in an immediate engine stall determination condition from a current rate of increase per unit time of a turbine rotation speed. Then, the ECU determines that immediate engine stall determination is affirmative when a rotation speed difference between the engine rotation speed and the turbine rotation speed becomes smaller than the predetermined value, and executes engine stall prevention control.

14 Claims, 6 Drawing Sheets

F I G . 1
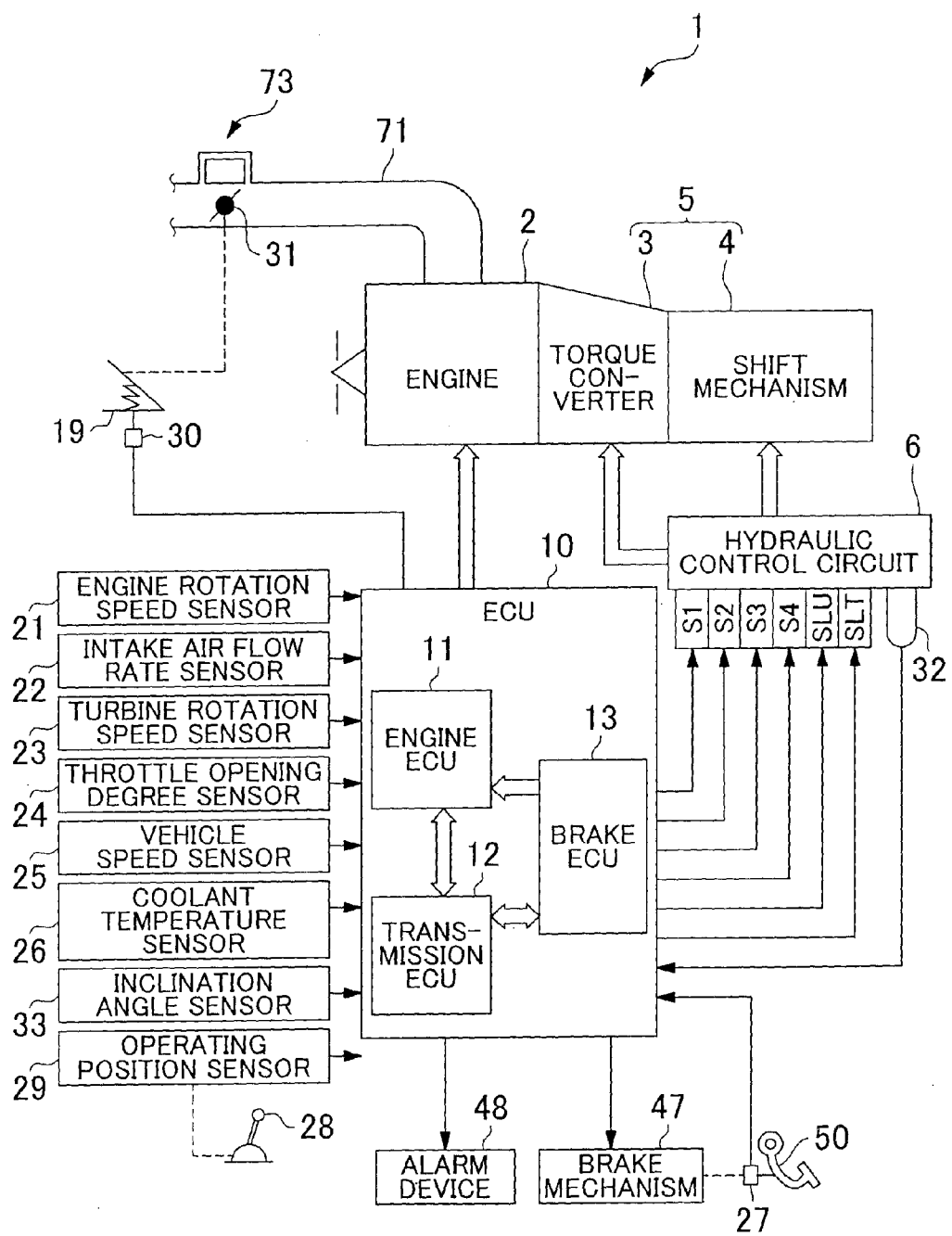

CONTROL DEVICE AND CONTROL METHOD FOR VEHICLE

BACKGROUND OF THE INVENTION

1. Field of the Invention

The invention relates to a control device and control method for a vehicle on which an internal combustion engine that serves as a driving force source is mounted.

2. Description of Related Art

A vehicle on which an internal combustion engine that serves as a driving force source is mounted is generally equipped with an oil pump that is driven by driving force from the internal combustion engine, and driver's operation is assisted through power steering, brake assist, or the like, by hydraulic pressure generated by the oil pump. In such a vehicle, when an engine stall occurs while travelling, the oil pump stops, and assist operation, such as power steering and brake assist, is stopped, so driving operation is problematically influenced. Then, the vehicle that travels using driving force from the internal combustion engine includes a control device that executes engine stall prevention control for preventing occurrence of an engine stall.

There is known a control device of this type (for example, see Japanese Patent Application Publication No. 2010-180987 (JP 2010-180987 A). When a vehicle speed increases in a direction opposite to a specified range in a state where an accelerator pedal is not depressed on an uphill and then the engine rotation speed of an internal combustion engine has decreased, the control device shift the inside of a transmission into an interlock state to restrict movement of a vehicle.

The control device described in JP 2010-180987 A is applied to the vehicle on which the internal combustion engine and the automatic transmission are mounted. Then, when neither the accelerator pedal nor a brake pedal is depressed on an uphill, and when the vehicle speed increases in a direction opposite to a specified range and, as a result, the engine rotation speed has decreased at a rate of change higher than or equal to a predetermined value, the control device determines that an engine stall is likely to occur. Then, the control device changes engagement states of a plurality of frictional engagement elements of the automatic transmission, and shifts the inside of the automatic transmission into an interlock state to stop the vehicle.

In addition, there is known a control device (for example, see Japanese Patent Application Publication No. 2010-96051 (JP 2010-96051 A). When a vehicle has travelled in a direction opposite to a specified range, the control device increases power output from an engine to restrict a change of a vehicle speed.

The control device described in JP 2010-96051 A, for example, increases an engine torque to restrict a rate of increase in vehicle speed in a direction opposite to a specified range in a situation that, while travelling on a narrow uphill, the vehicle and an oncoming vehicle cannot pass each other and the vehicle is reversed to a passing place, a driver does not change the specified range but only releases a brake pedal to intentionally reverse the vehicle in the opposite direction. Then, when the vehicle speed in the opposite direction has reached a predetermined value, the control device further increases the engine torque to keep the vehicle speed constant.

However, when the above-described control device described in JP 2010-180987 A determines that the vehicle starts travelling in a direction opposite to a specified range, the control device establishes an interlock state inside the automatic transmission to stop the vehicle, but the control device does not allow the vehicle to travel in the direction opposite to the specified range.

In addition, the control device described in JP 2010-96051 A restricts the vehicle speed or the rate of increase in the vehicle speed when the vehicle starts travelling in a direction opposite to a specified range, so the flexibility of adjustment of the vehicle speed by a driver is limited. That is, in the case where the driver desires to cause the vehicle to quickly travel in an opposite direction as well, the vehicle speed or the rate of increase in the vehicle speed is restricted, the vehicle may not reverse at a desired speed or it may take a time until the vehicle reaches a desired vehicle speed. Furthermore, the control device described in JP 2010-96051 A controls the engine torque on the condition that the brake pedal is released, so, for example, the driver is problematically not able to cause the vehicle to travel in an opposite direction at a desired speed while adjusting a depression amount of the brake pedal. As a result, the vehicle may not be reversed at a vehicle speed intended by the driver.

Therefore, both the control devices described in JP 2010-180987 A and JP 2010-96051 A are not able to freely adjust the vehicle speed in response to the condition of a travelling road, such as the width, gradient or curvature of an uphill or downhill, a presence of another surrounding vehicle, or the like, when the driver intentionally causes the vehicle to travel in a direction opposite to a specified range. Thus, both the control devices described in JP 2010-180987 A and JP 2010-96051 A are configured to prevent an engine stall; however, the behavior of the vehicle intended by the driver is not achieved, so drivability may deteriorate.

SUMMARY OF THE INVENTION

The invention provides a control device and control method for a vehicle, which are able to achieve both suppressing a deterioration of drivability and preventing occurrence of an engine stall.

An aspect of the invention provides a control device for a vehicle that transmits driving force from an internal combustion engine to a drive wheel via a transmission having a torque converter. The control device includes: an accelerator operation amount detecting unit that detects an accelerator operation amount; an engine rotation speed detecting unit that detects an engine rotation speed of the internal combustion engine; a vehicle speed detecting unit that detects a vehicle speed of the vehicle; an input shaft rotation speed detecting unit that detects an input shaft rotation speed of the transmission; an inclination angle detecting unit that detects an inclination angle of a road surface; an engine rotation speed increasing unit that increases the engine rotation speed of the internal combustion engine; an engine stall occurrence predicting unit that predicts occurrence of an engine stall in the internal combustion engine; and a prevention control unit that executes engine stall occurrence prevention control when the engine stall occurrence predicting unit has predicted occurrence of an engine stall, wherein the engine rotation speed increasing unit increases the engine rotation speed on the basis of the input shaft rotation speed detected by the input shaft rotation speed detecting unit on the condition that the accelerator operation amount that indicates that an accelerator pedal is released has been detected by the accelerator operation amount detecting unit, a fact that the vehicle is located on an inclined road surface has been detected by the inclination angle detecting unit and a travel of the vehicle in a direction opposite to a direction in which the vehicle travels by the transmitted driving force has been detected by the vehicle speed detecting unit, and the engine stall occurrence predicting unit predicts occurrence of an engine stall on the basis of a rotation speed difference between the engine rotation speed increased by the engine rotation speed increasing unit and the detected input shaft rotation speed.

With the above configuration, occurrence of an engine stall is predicted on the basis of the predetermined rotation speed difference between the engine rotation speed and the input shaft rotation speed, so it is possible to accurately predict occurrence of an engine stall. Therefore, it is possible to prevent unnecessary limitations on the vehicle speed of the vehicle in a state where a likelihood of occurrence of an engine stall is low. Thus, it is possible to achieve both suppressing a deterioration of drivability and preventing occurrence of an engine stall.

In addition, in the control device according to the above aspect, the engine rotation speed increasing unit may increase the engine rotation speed by executing idle speed control.

With the above configuration, the engine rotation speed is increased through idle speed control, so it is possible to suppress occurrence of an engine stall without making the driver experience a feeling of strangeness about the behavior of the vehicle.

In addition, in the control device according to the above aspect, the engine rotation speed increasing unit may increase the engine rotation speed while a maximum engine rotation speed, to which the engine rotation speed is allowed to increase through the idle speed control, is set as an upper limit, and the engine stall occurrence predicting unit may predict occurrence of an engine stall on the basis of a rotation speed difference between the upper limit and the input shaft rotation speed.

With the above configuration, the upper limit to which it is possible to increase the engine rotation speed through idle speed control is calculable in advance, so it is possible to predict occurrence of an engine stall sufficiently before the timing at which an engine stall actually occurs.

In addition, in the control device according to the above aspect, the engine rotation speed increasing unit may increase the engine rotation speed such that the rotation speed difference between the input shaft rotation speed and the engine rotation speed is kept at a predetermined set value.

With the above configuration, it is possible to prevent occurrence of an engine stall and to reduce the influence of an unnecessary increase in the engine rotation speed on a vehicle speed, so it is possible to suppress a decrease in drivability.

In addition, in the control device according to the above aspect, the engine rotation speed increasing unit may increase the set value as the inclination angle of the road surface, detected by the inclination angle detecting unit, increases.

With the above configuration, it is possible to set a steeper rising of an increase in the engine rotation speed with an inclination angle at which there is a higher likelihood of occurrence of an engine stall, cause an increase in the actual engine rotation speed to follow the target engine rotation speed, and prevent occurrence of an engine stall.

In addition, in the control device according to the above aspect, the prevention control unit may prevent occurrence of an engine stall by outputting an alarm to a driver.

With the above configuration, the driver is alarmed of the likelihood of occurrence of an engine stall, so the driver is allowed to start brake operation before occurrence of an engine stall. Thus, it is possible to prevent occurrence of an engine stall.

In addition, in the control device according to the above aspect, the prevention control unit may prevent occurrence of an engine stall by controlling a brake device, which brakes the vehicle, such that the vehicle is braked.

With the above configuration, when there is a likelihood of occurrence of an engine stall, the vehicle is braked, so it is possible to prevent occurrence of an engine stall.

Another aspect of the invention provides a control method for a vehicle that transmits driving force from an internal combustion engine to a drive wheel via a transmission having a torque converter. The control method includes: detecting an accelerator operation amount; detecting an engine rotation speed of the internal combustion engine; detecting a vehicle speed of the vehicle; detecting an input shaft rotation speed of the transmission; detecting an inclination angle of a road surface; increasing the engine rotation speed on the basis of the detected input shaft rotation speed on the condition that the accelerator operation amount that indicates that an accelerator pedal is released has been detected, a fact that the vehicle is located on an inclined road surface has been detected and a travel of the vehicle in a direction opposite to a direction in which the vehicle travels by the transmitted driving force has been detected; predicting occurrence of an engine stall on the basis of a rotation speed difference between the increased engine rotation speed and the detected input shaft rotation speed; and executing engine stall occurrence prevention control when occurrence of an engine stall has been predicted.

According to the aspects of the invention, the control device and control method for a vehicle, which are able to achieve both suppressing a decrease in drivability and preventing occurrence of an engine stall, are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic configuration view that shows a vehicle on which a control device according to an embodiment of the invention is mounted;

DETAILED DESCRIPTION OF EMBODIMENTS

Hereinafter, an embodiment of the invention will be described with reference to the accompanying drawings.

Figure 2:
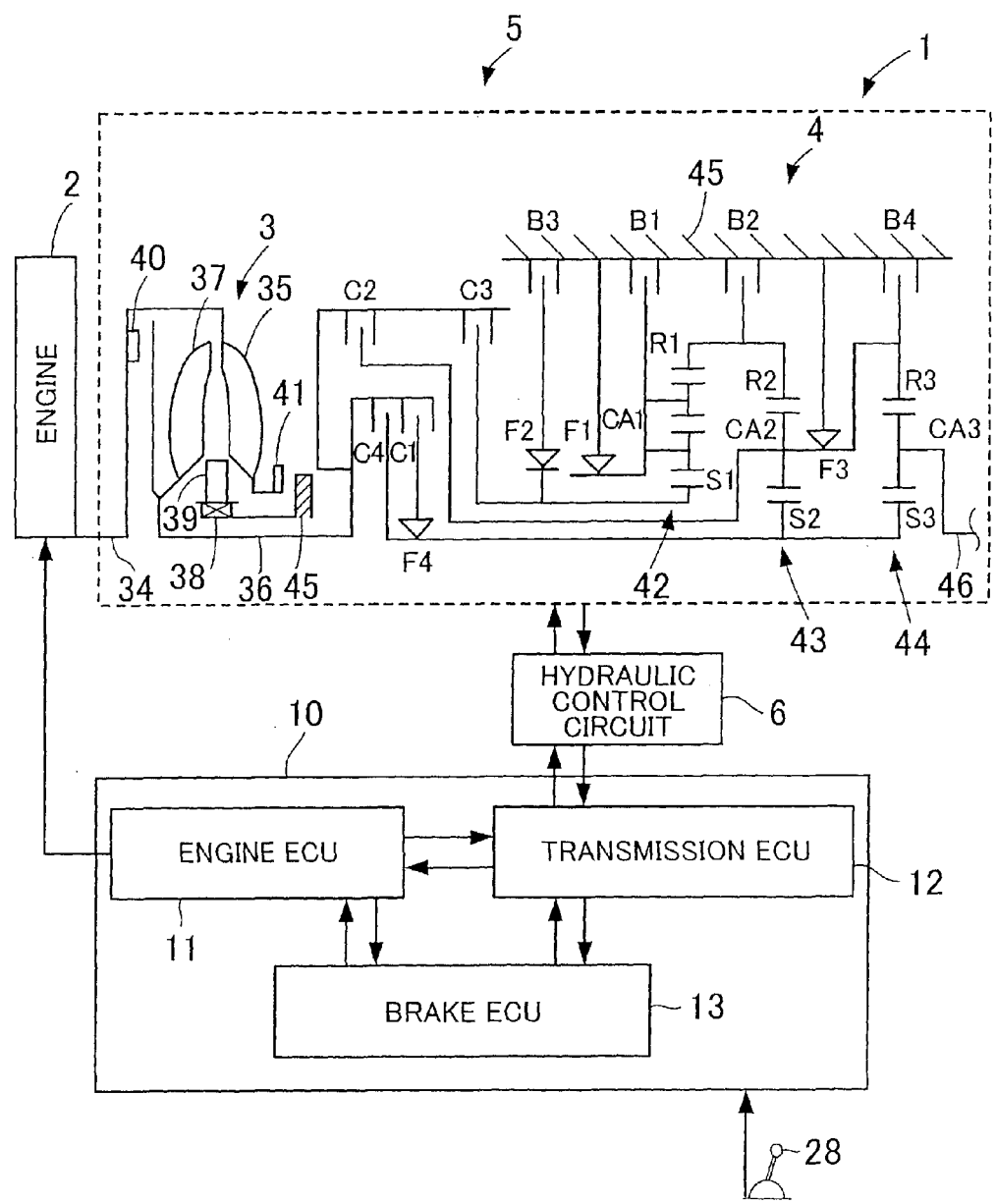
FIG. 2 is a skeletal view that shows the configuration of the control device for a vehicle according to the embodiment of the invention.

FIG. 1 is a schematic configuration view that shows a vehicle on which a control device according to the embodiment of the invention is mounted. FIG. 2 is a skeletal view that shows the configuration of the control device for a vehicle according to the embodiment of the invention. Note that, in the present embodiment, description will be made on the case where the control device for a vehicle according to the aspect of the invention is applied to a front-engine rear-drive (FR) vehicle.

As shown in FIG. 1 and FIG. 2, the vehicle 1 includes an engine 2, a torque converter 3 and a shift mechanism 4. The engine 2 constitutes an internal combustion engine. The torque converter 3 amplifies rotational torque output from the engine 2. The shift mechanism 4 changes the rotation speed of the output shaft of the torque converter 3 and outputs rotation torque. The rotational torque output from an output shaft 46 of the shift mechanism 4 is transmitted to drive wheels via a differential gear (not shown).

As will be described later, the engine 2 is formed of a known power unit that burns fuel, such as gasoline and light oil, to output power. In addition, the torque converter 3 and the shift mechanism 4 constitute an automatic transmission 5.

As shown in FIG. 1 and FIG. 2, the torque converter 3 is arranged between the engine 2 and the shift mechanism 4, and includes a pump impeller 35, a turbine impeller 37 and a stator impeller 39. The pump impeller 35 is coupled to the engine 2 via an input shaft 34. The turbine impeller 37 is coupled to the shift mechanism 4 via an output shaft 36. The output shaft 36 constitutes part of the input shaft of the shift mechanism 4. Rotation in one direction of the stator impeller 39 is blocked by a one-way clutch 38. The pump impeller 35 and the turbine impeller 37 are configured to transmit power via fluid. In addition, the input shaft 34 and output shaft 36 of the torque converter 3 are respectively coupled to the pump impeller 35 and the turbine impeller 37.

Furthermore, the torque converter 3 includes a lockup clutch 40 for directly coupling the pump impeller 35 and the turbine impeller 37 to each other. While the vehicle 1 is travelling at high speeds, the lockup clutch 40 engages a front cover (not shown) by the action of hydraulic fluid, and the pump impeller 35 and the turbine impeller 37 are placed in an engagement state where the pump impeller 35 and the turbine impeller 37 are mechanically directly coupled to each other. By so doing, the power transmission efficiency from the engine 2 to the shift mechanism 4 increases as compared with a released state. In addition, as will be described later, when a vehicle speed, an engine rotation speed, a turbine rotation speed, or the like, satisfies a predetermined condition, the torque converter 3 is placed in a slip state where the lockup clutch 40 slips at a predetermined slip ratio.

In addition, the pump impeller 35 is provided with a mechanical oil pump 41. The oil pump 41 generates hydraulic pressure for performing shift control over the shift mechanism 4 and hydraulic pressure for supplying lubricating oil to various portions.

The shift mechanism 4 includes a double-pinion-type first planetary gear unit 42, a single-pinion-type second planetary gear unit 43 and a single-pinion-type third planetary gear unit 44. A sun gear S1 of the first planetary gear unit 42 is able to be coupled to the input shaft via a clutch C3, and is able to be coupled to a housing 45 via a one-way clutch F2 and a brake B3.

A carrier CA1 of the first planetary gear unit 42 is able to be coupled to the housing 45 via a brake B1. In addition, rotation of the carrier CA1 in a direction opposite to the rotation direction of the input shaft is blocked by a one-way clutch F1 provided in parallel with the brake B1.

A ring gear R1 of the first planetary gear unit 42 is coupled to a ring gear R2 of the second planetary gear unit 43, and is able to be coupled to the housing 45 via a brake B2. A sun gear S2 of the second planetary gear unit 43 is coupled to a sun gear S3 of the third planetary gear unit 44, and is able to be coupled to the input shaft via a clutch C4. In addition, the sun gear S2 is able to be coupled to the input shaft via a one-way clutch F4 and a clutch C1.

A carrier CA2 of the second planetary gear unit 43 is coupled to a ring gear R3 of the third planetary gear unit 44. The carrier CA2 is able to be coupled to the input shaft via a clutch C2, and is able to be coupled to the housing 45 via a brake B4. In addition, rotation of the carrier CA2 in a direction opposite to the rotation direction of the input shaft is blocked by a one-way clutch F3 provided in parallel with the brake B4. In addition, a carrier CA3 of the third planetary gear unit 44 is coupled to the output shaft 46.

The clutches C1 to C4 and the brakes B1 to B4 (hereinafter, simply referred to as clutches C and brakes B when not specifically distinguished from one another) are formed of hydraulic frictional engagement devices, such as multi-disc clutches and multi-disc brakes, that are controlled for engagement by hydraulic actuators. In addition, the clutches C and the brakes B each are placed in any one of an engaged state and a released state in accordance with a hydraulic circuit that is changed through excitation or de-excitation of transmission solenoids S1 to S4 and linear solenoids SLT and SLU of a hydraulic control circuit 6 (described later) and an operation state of a manual valve (not shown). The shift mechanism 4 according to the present embodiment establishes a gear on the basis of a combination of the engaged states and released states of these clutches C and brakes B.

The vehicle 1 further includes the hydraulic control circuit 6 for controlling a torque amplification ratio of the torque converter 3 and the gear of the shift mechanism 4 with the use of hydraulic pressure. The hydraulic control circuit 6 includes the transmission solenoids S1 to S4, the linear solenoids SLT and SLU and an AT fluid temperature sensor 32. The AT fluid temperature sensor 32 is used to measure the temperature of hydraulic fluid.

The vehicle 1 further includes an intake pipe 71 for introducing air outside the vehicle into the engine 2. The intake pipe 71 includes a throttle valve 31 and an idle speed control (ISC) bypass passage 73. The throttle valve 31 is used to adjust the flow rate of air. The ISC bypass passage 73 is used to adjust the flow rate of air supplied to the engine 2 when the operation state of the engine 2 is an idle state.

An ISC valve is provided in the ISC bypass passage 73. The ISC valve is used to adjust the flow rate of air. The ISC valve is driven by an ISC valve actuator controlled by an ECU 10 to change the flow rate in the ISC bypass passage 73.

When the engine 2 is in an idle operation state, the ECU 10 fully closes the throttle valve 31, and executes ISC control (described later) to adjust the opening degree of the ISC valve. Thus, air required for combustion in an idle state is supplied to the engine 2 via the ISC bypass passage 73.

The vehicle 1 further includes an engine rotation speed sensor 21, an intake air flow rate sensor 22, a turbine rotation speed sensor 23, a throttle opening degree sensor 24, a vehicle speed sensor 25, a coolant temperature sensor 26 and a brake sensor 27. The engine rotation speed sensor 21 is used to measure the rotation speed of the engine 2, that is, the engine rotation speed. The intake air flow rate sensor 22 measures the intake air flow rate of the engine 2. The turbine rotation speed sensor 23 is used to measure the rotation speed of the output shaft 36 of the torque converter 3, connected to the turbine impeller 37. The throttle opening degree sensor 24 is used to measure the opening degree of the throttle valve 31. The vehicle speed sensor 25 is used to measure the vehicle speed on the basis of the rotation speed of the output shaft 46 of the shift mechanism 4. The coolant temperature sensor 26 is used to measure the coolant temperature of the engine 2. The brake sensor 27 measures the depression force on a brake pedal 50. The vehicle 1 further includes a shift lever 28, an operating position sensor 29, an accelerator operation amount sensor 30, an inclination angle sensor 33 and an alarm device 48. The operating position sensor 29 detects the position of the shift lever 28. The accelerator operation amount sensor 30 is used to measure the accelerator operation amount. The inclination angle sensor 33 detects the inclination angle of a road surface on which the vehicle 1 is travelling. The alarm device 48 is used to alarm a driver of a likelihood of occurrence of an engine stall.

The engine rotation speed sensor 21 is configured to measure the rotation speed of the engine 2 on the basis of rotation of a crankshaft (not shown). Thus, at least any one of the engine rotation speed sensor 21 and the ECU 10 according to the present embodiment constitutes an engine rotation speed detecting unit according to the aspect of the invention.

The turbine rotation speed sensor 23 is configured to measure the rotation speed of the output shaft 36 of the torque converter 3 and then output a signal that indicates the turbine rotation speed to the ECU 10. Thus, at least any one of the turbine rotation speed sensor 23 and the ECU 10 according to the present embodiment constitutes an input shaft rotation speed detecting unit according to the aspect of the invention. The throttle opening degree sensor 24 is, for example, formed of a Hall element that is able to obtain an output voltage based on the throttle opening degree of the throttle valve 31, and is configured to output a signal that indicates the throttle opening degree of the throttle valve 31 to the ECU 10 (described later).

The vehicle speed sensor 25 is configured to generate a signal that indicates the vehicle speed by detecting rotation of a plurality of teeth formed on a rotor mounted on the output shaft 46 of the automatic transmission 5 and output the signal to the ECU 10 (described later). Thus, at least any one of the vehicle speed sensor 25 and the ECU 10 constitutes a vehicle speed detecting unit according to the aspect of the invention. Note that the vehicle speed sensor 25 is able to determine whether the vehicle 1 is travelling forward or backward on the basis of the position of a plurality of no-tooth portions formed on the rotor.

The brake sensor 27 is configured to measure a variation in master cylinder pressure or an operation stroke based on a driver's depression force on the brake pedal 50, and is configured to output an electric signal corresponding to the measured depression force to the ECU 10 (described later) as a brake depression force signal.

The operating position sensor 29 is configured to detect the operating position of the shift lever 28 operated by the driver.

The accelerator operation amount sensor 30 is, for example, formed of an electronic position sensor that uses a Hall element. When an accelerator pedal 19 mounted on the vehicle 1 is operated by the driver, the accelerator operation amount sensor 30 is configured to output a signal that indicates the accelerator operation amount indicated by the position of the accelerator pedal 19 to the ECU 10 (described later). Thus, at least any one of the accelerator operation amount sensor 30 and the ECU 10 according to the present embodiment constitutes an accelerator operation amount detecting unit according to the aspect of the invention.

The inclination angle sensor 33 is, for example, formed of a G sensor, and is configured to output a signal corresponding to the gradient of a road surface on which the vehicle 1 is travelling to the ECU 10 (described later). Thus, at least one of the inclination angle sensor 33 and the ECU 10 according to the present embodiment constitutes an inclination angle detecting unit according to the aspect of the invention.

The alarm device 48 is, for example, formed of a buzzer that is able to output an alarm sound. When occurrence of an engine stall is predicted through immediate engine stall determination control (described later), the ECU 10 notifies the driver via the alarm device 48 through an alarm sound that occurrence of an engine stall is predicted. Note that the alarm device 48 may be formed of a speaker of an audio system mounted on the vehicle 1. In addition, the alarm device 48 may indicate an alarm on a display mounted on the vehicle 1.

The vehicle 1 further includes the electronic control unit (ECU) 10. In the present embodiment, the ECU 10 is formed of an engine ECU 11, a transmission ECU 12 and a brake ECU 13. The engine ECU 11 is used to electrically control the engine 2. The transmission ECU 12 is used to electrically control the automatic transmission 5. The brake ECU 13 controls a brake mechanism 47. The brake mechanism 47 is used to brake the vehicle 1 by restricting rotation of the drive wheels and driven wheels of the vehicle 1.

The ECU 10 includes a central processing unit (CPU), a random access memory (RAM), a read only memory (ROM) and input/output interfaces (not shown). The ECU 10 outputs an engine control signal to the engine 2 such that the engine 2 is controlled in accordance with the operation amount of the accelerator pedal 19.

In addition, the ECU 10 is connected to the engine rotation speed sensor 21, the intake air flow rate sensor 22, the turbine rotation speed sensor 23, the throttle opening degree sensor 24, the vehicle speed sensor 25, the coolant temperature sensor 26, the brake sensor 27, the operating position sensor 29, the accelerator operation amount sensor 30 and the inclination angle sensor 33. The ECU 10 receives signals that indicate the engine rotation speed, the intake air flow rate, the turbine rotation speed, the throttle opening degree, the vehicle speed, the coolant temperature, the brake depression force, the operating position of the shift lever 28, the accelerator operation amount and the inclination angle of a road surface of a road on which the vehicle 1 is travelling, respectively from these sensors.

In addition, the ECU 10 is configured to control the hydraulic control circuit 6 on the basis of these signals such that the engagement state of the lockup clutch 40 of the torque converter 3 and the gear of the shift mechanism 4 are controlled. In addition, the ROM of the ECU 10 stores a shift line map based on a vehicle speed and a throttle opening degree, a program for executing shift control, and the like.

Note that the ECU 10 may be configured to have an automatic shift mode and a manual shift mode. In the automatic shift mode, the gear is selected on the basis of the travelling state of the vehicle 1. In the manual shift mode, the gear is selected on the basis of manual operation. Here, the travelling state of the vehicle 1 means a state, such as the speed of the vehicle 1, the throttle opening degree, the coolant temperature and the AT fluid temperature.

Note that the ECU 10 constitutes a control device for a vehicle, an engine rotation speed increasing unit, an engine stall occurrence predicting unit and a prevention control unit according to the aspect of the invention as will be described later.

Hereinafter, a feature of the configuration of the ECU 10 that constitutes the control device for a vehicle according to the embodiment of the invention will be described with reference to FIG. 1 to FIG. 5.

It is assumed that, in a state where a D range is selected by the driver, for example, an oncoming vehicle approaches from ahead of the vehicle 1 while the vehicle 1 is travelling on an uphill on which it is difficult to pass each other. In this case, it is presumable that the driver does not operate the shift lever 28 and releases the brake pedal 50 at the D range to cause the vehicle 1 to travel backward under its own weight, that is, to cause the vehicle 1 to slide down, and moves the vehicle 1 to a place in which it is possible to pass each other.

Similarly, it is presumable that, in a state where an R range is selected by the driver, while the vehicle 1 is travelling backward on a downhill, the driver causes the vehicle 1 to travel forward under the own weight of the vehicle 1 while keeping the state of the R range in order to adjust the location of the vehicle 1.

At this time, the input shaft 34 of the torque converter 3, connected to the crankshaft of the engine 2, and the output shaft 36 of the torque converter 3, connected to the input shaft of the shift mechanism 4, rotate in mutually opposite directions.

The torque of the input shaft 34 and the torque of the output shaft 36 in opposite directions cancel each other via oil inside the torque converter 3. However, when the absolute value of the ratio of the rotation speed of the output shaft 36 to the rotation speed of the input shaft 34 exceeds one, a load on the pump impeller 35 steeply increases, and the rotation of the engine 2 becomes unstable, causing a likelihood of occurrence of an engine stall.

Then, when the ECU 10 that constitutes the control device for a vehicle according to the aspect of the invention determines that the vehicle 1 is travelling backward on an uphill in a state where the D range is selected or the vehicle 1 is travelling forward on a downhill in a state where the R range is selected, that is, when the vehicle 1 is travelling in a direction opposite to a specified range, as the ECU 10 has detected the turbine rotation speed on the basis of the signal input from the turbine rotation speed sensor 23, the ECU 10 increases the engine rotation speed by executing ISC control to keep a rotation speed difference A [rpm] between the engine rotation speed and the turbine rotation speed constant such that the absolute value of the ratio of the rotation speed of the output shaft 36 to the rotation speed of the input shaft 34 does not exceed one. Specifically, the ECU 10 increases the intake air flow rate in an idle state of the engine 2 by controlling the ISC valve actuator to increase the engine rotation speed. By so doing, a steep increase in load on the pump impeller 35 is suppressed, power output from the engine 2 is stabilized, and occurrence of an engine stall is prevented. That is, the ECU 10 according to the present embodiment constitutes the engine rotation speed increasing unit according to the aspect of the invention. In addition, the rotation speed difference A means a predetermined set value according to the aspect of the invention.

In addition, the ECU 10 prestores an upper limit of the engine rotation speed through execution of ISC control in the ROM. The upper limit is determined through experimental measurement in advance as an engine rotation speed to which the engine rotation speed is allowed to increase through control over the ISC valve actuator in an idle state of the engine 2.

In addition, when the difference between the engine rotation speed that has reached the upper limit through ISC control and the turbine rotation speed becomes smaller than a predetermined value B [rpm], the ECU 10 determines that there is a likelihood of occurrence of an engine stall and sets an immediate engine stall affirmative determination flag to an on state. That is, the ECU 10 according to the present embodiment constitutes the engine stall occurrence predicting unit according to the aspect of the invention. The predetermined value B is set in consideration of a period of time from when the ECU 10 alarms the driver via the alarm device 48 to when the driver operates the brake pedal 50 and, as a result, the vehicle 1 brakes.

In addition, when the immediate engine stall affirmative determination flag enters an on state, the ECU 10 controls the alarm device 48 such that the alarm device 48 outputs an alarm sound to alarm the driver of a likelihood of occurrence of an engine stall. That is, the ECU 10 according to the present embodiment constitutes the prevention control unit according to the aspect of the invention.

Note that the ECU 10 may control the brake mechanism 47 mounted on the vehicle 1 such that the brake mechanism 47 brakes the vehicle 1 instead of causing the alarm device 48 to output an alarm sound. In addition, it is applicable that, when the ECU 10 determines that the brake pedal 50 is not depressed within a predetermined period of time after the alarm device 48 outputs an alarm sound as well, the brake mechanism 47 is controlled to brake the vehicle 1.

Figure 3:
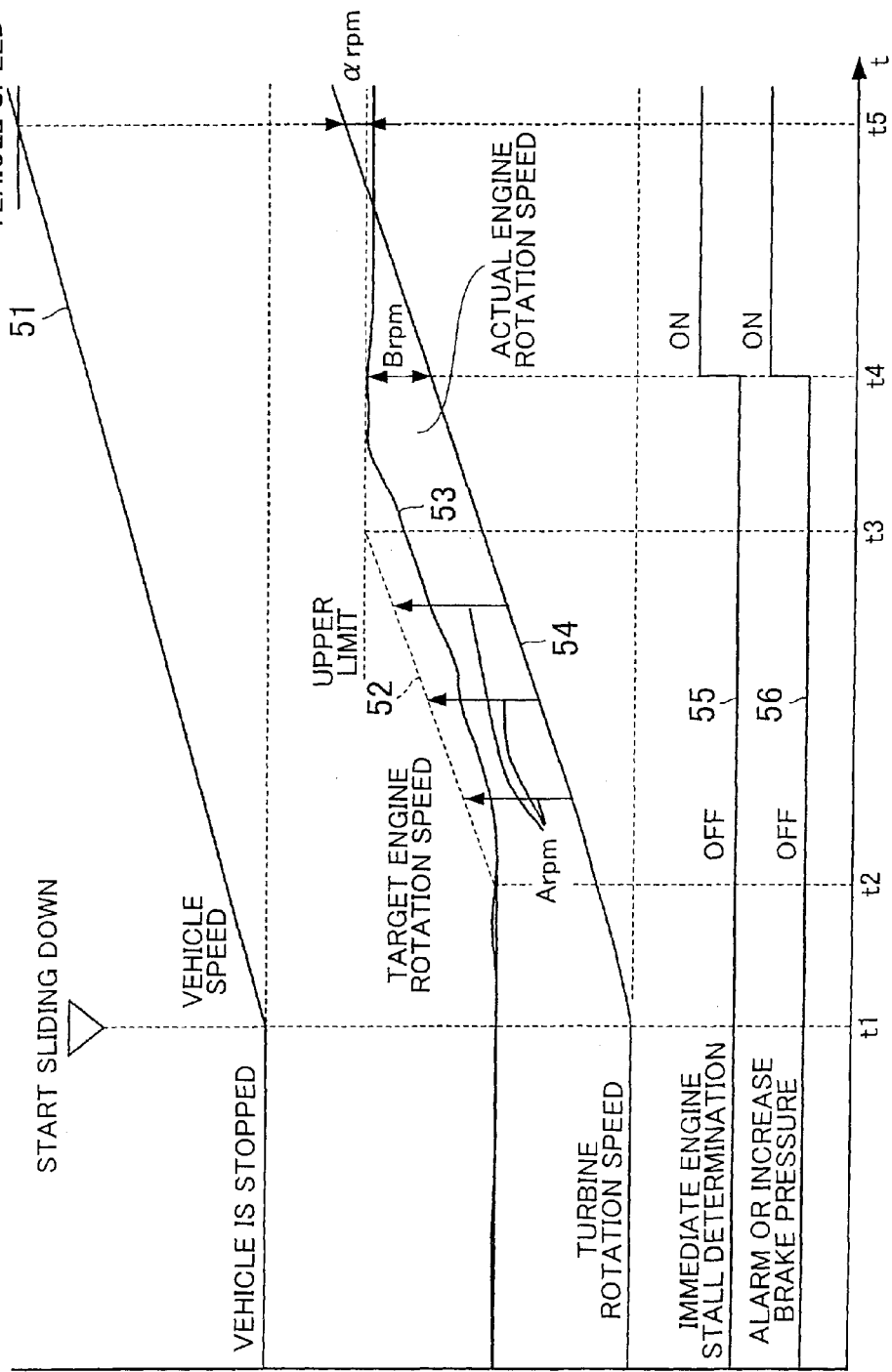
FIG. 3 is a timing chart for illustrating immediate engine stall determination control according to the embodiment of the invention.
Figure 4:
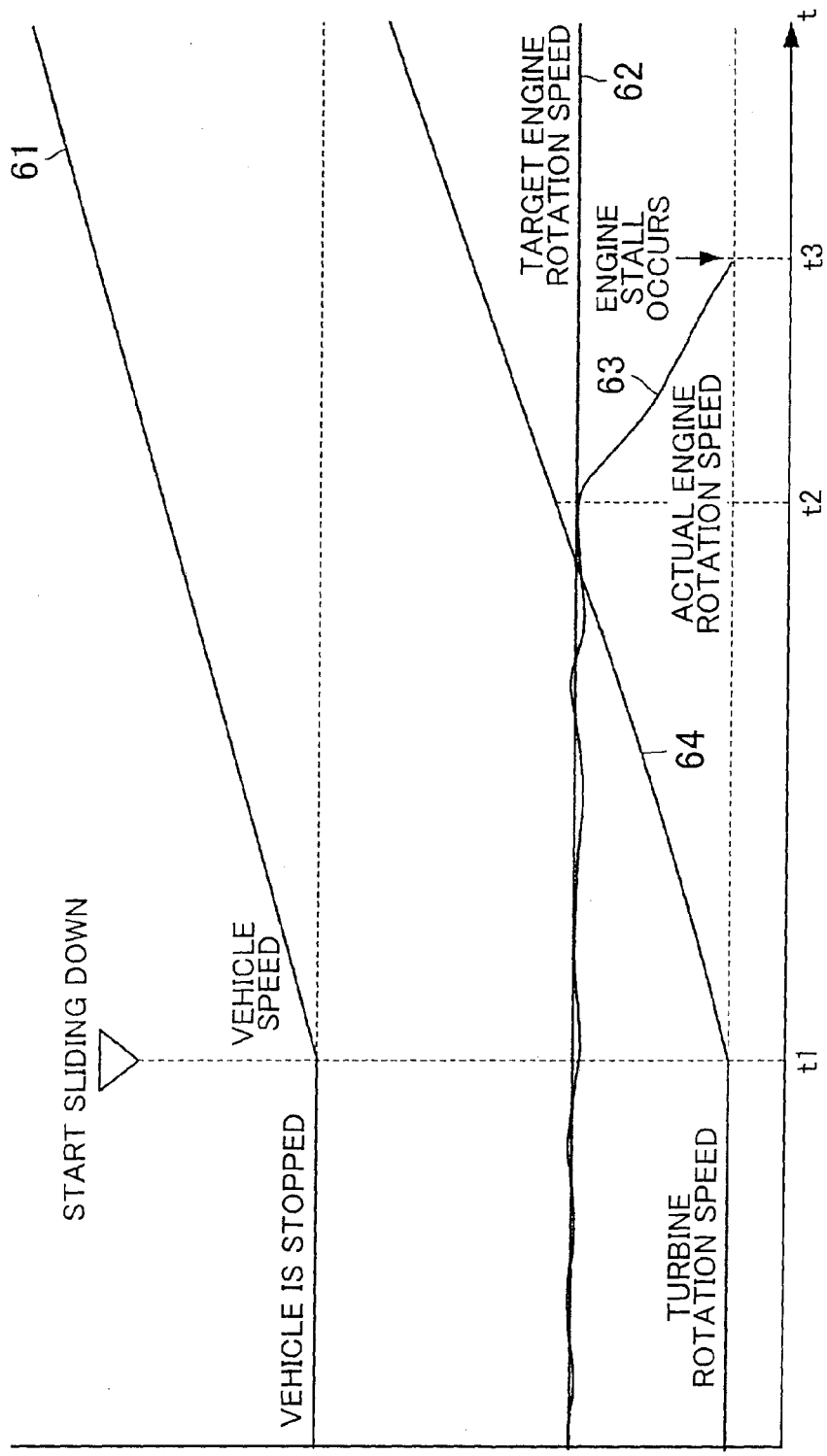
FIG. 4 is a timing chart for illustrating immediate engine stall determination control.

FIG. 3 is a timing chart for illustrating immediate engine stall determination control according to the embodiment of the invention. In addition, FIG. 4 is a timing chart that shows changes in engine rotation speed, and the like, in the case where immediate engine stall determination control according to the present embodiment is not executed.

In FIG. 3, the vehicle 1 is initially stopped on an uphill, and the brake pedal 50 is depressed by the driver in a D range state. Then, at time t1, when the brake pedal 50 is released by the driver, the vehicle 1 starts travelling backward (see solid line 51).

At this time, the ECU 10 determines that the vehicle 1 is stopped on the uphill on the basis of the signal input from the inclination angle sensor 33. In addition, the ECU 10 determines that the accelerator pedal 19 is not depressed by the driver on the basis of the signal input from the accelerator operation amount sensor 30.

The ECU 10 increases the engine rotation speed to a value that is higher by a predetermined value A [rpm] than the turbine rotation speed such that the absolute value of the ratio of the turbine rotation speed to the engine rotation speed does not exceed one. In this case, the ECU 10 sets the engine rotation speed higher by the predetermined value A [rpm] than the turbine rotation speed as a target engine rotation speed, and causes an actual engine rotation speed to follow the target engine rotation speed through known feedback control.

Note that, in a state where the engine rotation speed is a minimum engine rotation speed for stably keeping idle operation, when the difference between the engine rotation speed and the turbine rotation speed is larger than A [rpm], that is, between time t1 and time t2 in FIG. 3, the ECU 10 keeps the target engine rotation speed at the minimum engine rotation speed.

Then, when the rotation speed difference between the turbine rotation speed and the minimum engine rotation speed becomes smaller than the predetermined value A, that is, after time t2, the target engine rotation speed is set such that the rotation speed difference between the engine rotation speed and the turbine rotation speed becomes the predetermined value A [rpm], and ISC control is executed such that the actual engine rotation speed follows the target engine rotation speed.

In addition, in the present embodiment, the target engine rotation speed has an upper limit to which it is possible to increase the engine rotation speed through ISC control, so the ECU 10 keeps the target engine rotation speed at the upper limit after time t3 in FIG. 3 (see broken line 52).

In addition, when the ECU 10 has determined at time t1 that the vehicle 1 starts travelling in a direction opposite to a specified range, the ECU 10 has already started immediate engine stall determination. In the immediate engine stall determination, a rotation speed difference B [rpm] between the engine rotation speed and the turbine rotation speed, which is a determination condition for determining that an engine stall occurs, is calculated on the basis of an engine stall predicted vehicle speed Vpred, which are empirically obtained in advance, and a rotation speed difference a between the engine rotation speed and the turbine rotation speed at that time. Thus, the ECU 10 determines that the immediate engine stall determination is affirmative when the rotation speed difference between the engine rotation speed and the turbine rotation speed becomes smaller than the rotation speed difference B.

Then, when the ECU 10 determines at time t4 that the rotation speed difference between the engine rotation speed and the turbine rotation speed is smaller than B, the ECU 10 sets a flag indicating that the immediate engine stall determination is affirmative to an on state (see solid line 55), and alarms the driver (see solid line 56).

In contrast to this, as shown in FIG. 4, in a vehicle that does not execute immediate engine stall determination control, in a state where the vehicle is stopped on an uphill at a D range, when both the accelerator pedal 19 and the brake pedal 50 are released by the driver at time t1, the vehicle starts travelling backward (see solid line 61). Accordingly, the turbine rotation speed also increases (see solid line 64).

At this time, an ECU does not increase the engine rotation speed through ISC control, so the target engine rotation speed remains unchanged (see solid line 62).

Then, at time t2, the absolute value of the ratio of the turbine rotation speed to the engine rotation speed exceeds one (see solid lines 63 and 64). Therefore, a load on the pump impeller 35 increases and the rotation of the engine 2 becomes unstable, so the engine rotation speed starts decreasing, and an engine stall occurs at time t3 (see solid line 63).

Figure 5:
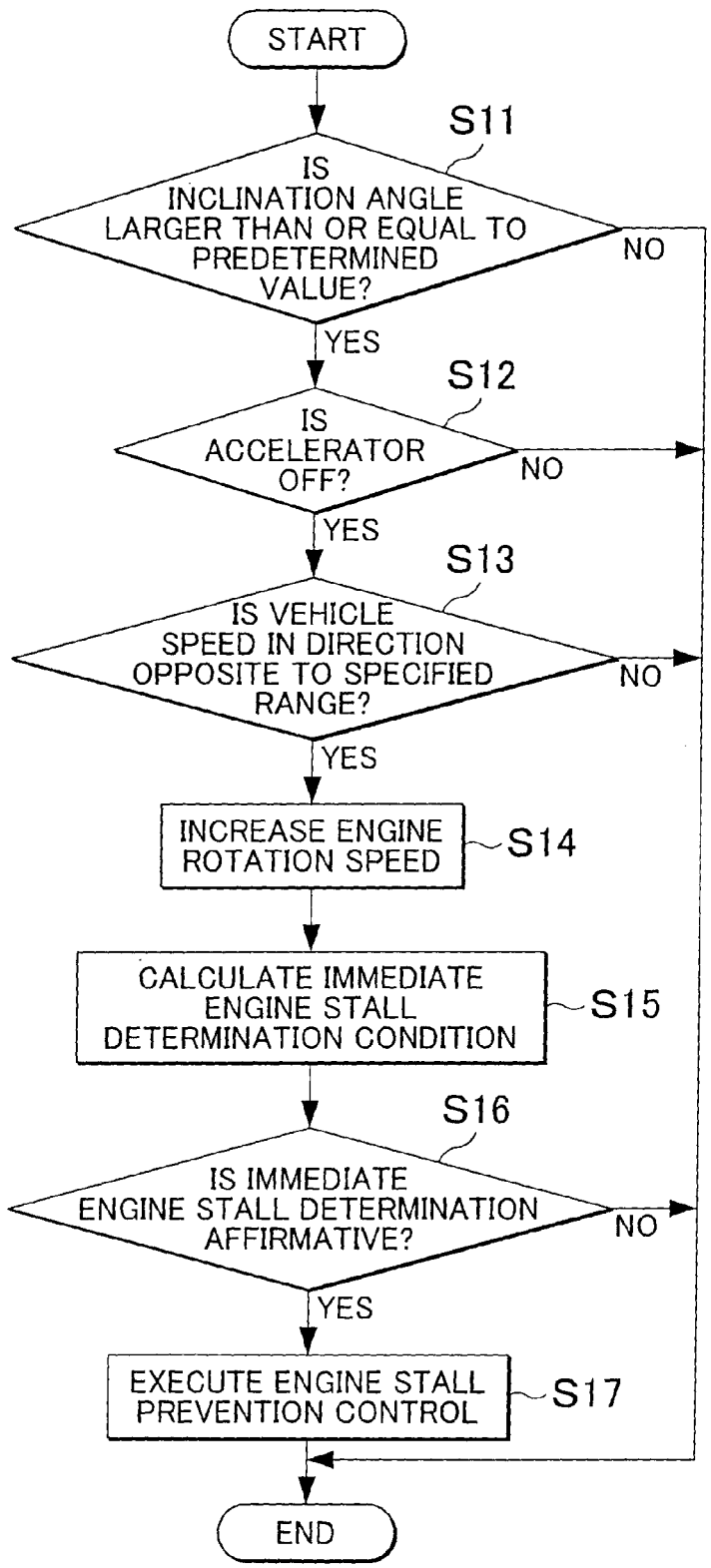
FIG. 5 is a flowchart for illustrating an immediate engine stall determination control process according to the embodiment of the invention.

Next, an immediate engine stall determination control process according to the present embodiment will be described with reference to FIG. 5.

Note that the following process is executed by the CPU of the ECU 10 at predetermined time intervals, and implements a program that is processable by the CPU.

First, the ECU 10 determines whether the inclination angle of an uphill or a downhill on which the vehicle 1 is stopped is larger than or equal to a predetermined value on the basis of the signal input from the inclination angle sensor 33 (step S11). The predetermined angle for the inclination angle is preset as an angle of a road surface, at which, when the accelerator pedal 19 and the brake pedal 50 are released by the driver, the vehicle 1 may travel in a direction opposite to a specified range under its own weight.

When the ECU 10 determines that the inclination angle is larger than or equal to the predetermined value (YES in step S11), the ECU proceeds with the process to step S12; whereas, when the ECU 10 determines that the inclination angle is smaller than the predetermined value (NO in step S11), the ECU 10 ends the process.

Subsequently, the ECU 10 determines whether the accelerator is off on the basis of the signal input from the accelerator operation amount sensor 30 (step S12). When the ECU 10 determines that the accelerator is off (YES in step S12), the ECU 10 proceeds with the process to step S13; whereas, when the ECU 10 determines that the accelerator is not off (NO in step S12), the ECU 10 ends the process.

Subsequently, the ECU 10 determines whether the vehicle speed in a direction opposite to the travelling direction of the vehicle 1, indicated by the specified range, is increasing on the basis of the signals input from the vehicle speed sensor 25 and the operating position sensor 29 (step S13). When the ECU 10 acquires the signals that indicate that the vehicle speed indicating that the vehicle 1 is travelling backward in a state where the D range is selected or acquires the signals that indicate the vehicle speed indicating that the vehicle 1 is travelling forward in a state where the R range is selected, the ECU 10 determines that the vehicle speed in a direction opposite to the travelling direction of the vehicle 1, indicated by the specified range, is increasing (YES in step S13), and proceeds with the process to step S14. On the other hand, when the ECU 10 determines that the vehicle speed in the same direction as the travelling direction of the vehicle 1, indicated by the specified range, is increasing (NO in step S13), the ECU 10 ends the process.

Subsequently, the ECU 10 increases the engine rotation speed (step S14). Specifically, when the ECU 10 receives the signal that indicates the turbine rotation speed from the turbine rotation speed sensor 23, the ECU 10 sets a rotation speed higher by the predetermined value A [rpm] than the turbine rotation speed as the target engine rotation speed. Then, the ECU 10 controls the ISC valve actuator through feedback control such that the actual engine rotation speed follows the target engine rotation speed.

Note that the predetermined value A [rpm] is determined in advance through experimental measurement such that, in consideration of a delay of time from when the ECU 10 starts control over the ISC valve actuator to when the flow rate of air taken into each cylinder of the engine 2 actually increases, the actual engine rotation speed is kept higher than the turbine rotation speed even when an increase in the actual engine rotation speed delays against an increase in the target engine rotation speed.

Subsequently, the ECU 10 calculates an immediate engine stall determination condition (step S15). In this step, the ECU 10 acquires the predicted vehicle speed Vpred at which an engine stall occurs and the rotation speed difference a [rpm] between the turbine rotation speed and the engine rotation speed at that time from the ROM. The predicted vehicle speed Vpred and the rotation speed difference a [rpm] are calculated in advance from specification values, such as the diameter of each wheel of the vehicle 1, the gear ratio of the vehicle 1 and the upper limit of the engine rotation speed in ISC control.

Then, the ECU 10 obtains a current rate of increase per unit time of the turbine rotation speed, and sets the immediate engine stall determination condition such that, even when brake operation is performed after the driver is alarmed as a result that the rotation speed difference between the engine rotation speed and the turbine rotation speed becomes smaller than the predetermined value used in the immediate engine stall determination condition, it is possible to ensure a value at which it is possible to sufficiently prevent occurrence of an engine stall.

Here, the rate of increase per unit time of the turbine rotation speed and the determination rotation speed difference B [rpm] used in the immediate engine stall determination condition are desirably stored in the ROM in advance as a determination rotation speed difference calculation map in which the rate of increase per unit time of the turbine rotation speed and the determination rotation speed difference B [rpm] are associated with each other.

Subsequently, the ECU 10 determines whether the rotation speed difference between the engine rotation speed and the turbine rotation speed becomes smaller than the determination rotation speed difference B [rpm] calculated in step S15 (step S16).

When the ECU 10 determines that the rotation speed difference is smaller than the predetermined value B [rpm], the ECU 10 determines that there is a likelihood of occurrence of an engine stall, that is, the immediate engine stall determination is affirmative (YES in step S16), and the ECU 10 proceeds with the process to step S17. On the other hand, when the ECU 10 determines that the immediate engine stall determination is negative (NO in step S16), the ECU 10 ends the process.

Then, when the ECU 10 proceeds with the process to step S17, the ECU 10 executes engine stall prevention control. In the present embodiment, the ECU 10 controls the alarm device 48 to output an alarm sound and alarms the driver of occurrence of an engine stall as engine stall prevention control.

As described above, the control device for a vehicle according to the embodiment of the invention predicts occurrence of an engine stall on the basis of the predetermined rotation speed difference between the engine rotation speed and the input shaft rotation speed, so it is possible to accurately predict occurrence of an engine stall. Therefore, it is possible to prevent unnecessary limitations on the vehicle speed of the vehicle 1 in a state where a likelihood of occurrence of an engine stall is low. Thus, it is possible to achieve both suppressing a deterioration of drivability and preventing occurrence of an engine stall.

In addition, the engine rotation speed is increased through idle speed control, so it is possible to suppress occurrence of an engine stall without making the driver experience a feeling of strangeness about the behavior of the vehicle 1.

In addition, the upper limit to which it is possible to increase the engine rotation speed through idle speed control is calculable in advance, so it is possible to predict occurrence of an engine stall sufficiently before the timing at which an engine stall actually occurs.

In addition, the driver is alarmed of a likelihood of occurrence of an engine stall, so the driver is allowed to start brake operation before occurrence of an engine stall. Thus, it is possible to prevent occurrence of an engine stall.

Note that, in the above description, the description is made on the case where the ECU 10 acquires the signal that indicates a range selected by the driver, that is, a specified range. However, the ECU 10 may acquire the signal that indicates a specified gear selected by the driver instead of the signal that indicates a specified range.

In addition, the description is made on the case where the automatic transmission 5 constitutes a transmission according to the aspect of the invention; however, the transmission is not limited to this configuration. A continuously variable transmission that is able to steplessly set a speed ratio, such as a belt-type continuously variable transmission, may constitute the transmission according to the aspect of the invention.

In addition, the above description is made on the case where the ECU 10 calculates the predetermined value B [rpm] on the basis of the predicted vehicle speed Vpred at which an engine stall occurs, and the like, and makes immediate engine stall determination using the predetermined value B; however, it is not limited to this configuration. The ECU 10 may determine that immediate engine stall determination is affirmative when the vehicle speed of the vehicle 1 has reached a vehicle speed that is lower by a predetermined value than the predicted vehicle speed Vpred. In addition, the ECU 10 may calculate estimated reaching time at which the predicted vehicle speed Vpred is reached on the basis of an acceleration at which the vehicle 1 travels backward and may determine that immediate engine stall determination is affirmative at the timing that is a predetermined period of time before the estimated reaching time.

In addition, the above description is made on the case where, when the ECU 10 determines that the vehicle 1 is travelling backward on an uphill in a state where the D range is selected or the vehicle 1 is travelling forward on a downhill in a state where the R range is selected, the ECU 10 sets the target engine rotation speed to a value higher by the predetermined value A [rpm] than the turbine rotation speed; however, it is not limited to this configuration. As will be described below, the ECU 10 may set the predetermined value A such that the predetermined value A is variable on the basis of the inclination angle of a road surface. In this case, the ECU 10 sets the predetermined value A as follows. Note that description will be made on an example in which the specified range is the D range and the driver causes the vehicle 1 to travel backward under its own weight.

When the vehicle 1 is stopped on a road surface having a gradient, a gradient resistance fsl to the vehicle 1 is expressed by the following mathematical expression (1).

$$\text{Gradient Resistance } fsl = W \times g \times \sin\theta \tag{1}$$

Here, W denotes the weight of the vehicle 1, g denotes the acceleration of gravity, and θ denotes the inclination angle of the road surface.

Figure 6:
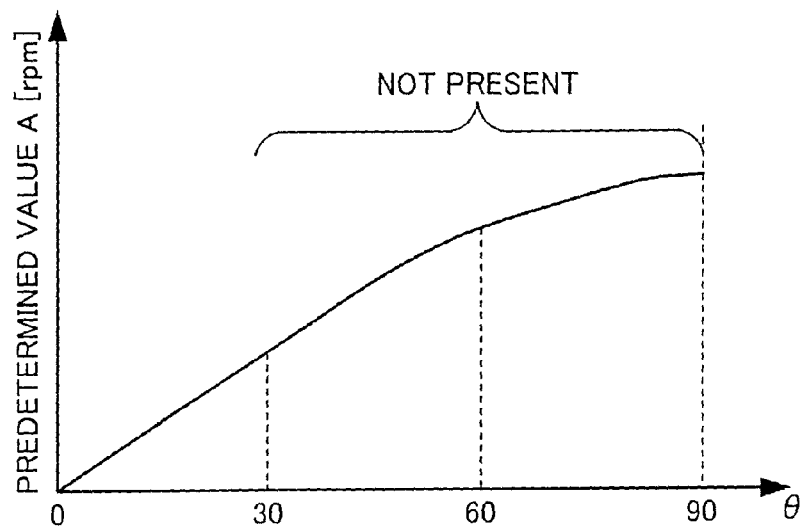
FIG. 6 is a graph for illustrating another example of settings of a target engine rotation speed according to the embodiment of the invention.

As the gradient resistance increases, the reverse acceleration of the vehicle 1 increases, so an increase in the engine rotation speed through ISC control delays in following an increase in the turbine rotation speed. Then, as shown in FIG. 6, the ECU 10 sets the predetermined value A [rpm] to a larger value as the gradient resistance fsl increases. By so doing, rising of the actual engine rotation speed is made steep, and occurrence of an engine stall is further reliably prevented.

Here, when the inclination angle is small, the vehicle speed of the vehicle 1 almost does not increase. In addition, the inclination angle of the road surface is generally set to a value smaller than 30°.

Figure 7:
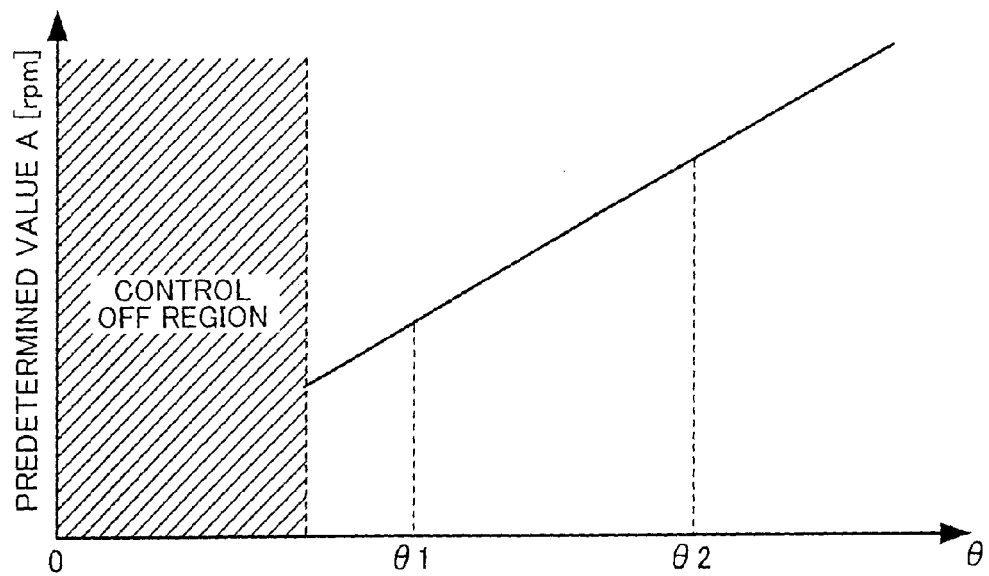
FIG. 7 is a graph for illustrating another example of settings of a target engine rotation speed according to the embodiment of the invention.

Thus, actually, as shown in FIG. 7, a map that is expressed by the linear relationship of the predetermined value A against the inclination angle while the maximum of the inclination angle is set to 30° is desirably stored in the ROM in advance.

By setting the predetermined value A in this way, the ECU 10 is able to set a steeper rising of an increase in the engine rotation speed with an inclination angle having a higher likelihood of occurrence of an engine stall, cause an increase in the actual engine rotation speed to follow the target engine rotation speed, and prevent occurrence of an engine stall.

As described above, the control device for a vehicle according to the aspect of the invention is advantageous in that it is possible to achieve both suppressing a decrease in drivability and preventing occurrence of an engine stall, so it is useful in the control device for a vehicle mounted on an internal combustion engine that serves as a driving force source.

The invention claimed is:

1. A control device for a vehicle that transmits driving force from an internal combustion engine to a drive wheel via a transmission having a torque converter, comprising:
an accelerator operation amount detecting unit configured to detects an accelerator operation amount;
an engine rotation speed detecting unit configured to detects an engine rotation speed of the internal combustion engine;

a vehicle speed detecting unit configured to detects a vehicle speed of the vehicle;

an input shaft rotation speed detecting unit configured to detects an input shaft rotation speed of the transmission;

an inclination angle detecting unit configured to detects an inclination angle of a road surface;

an engine rotation speed increasing unit configured to increases the engine rotation speed of the internal combustion engine;

an engine stall occurrence predicting unit configured to predicts occurrence of an engine stall in the internal combustion engine; and a prevention control unit configured to executes engine stall occurrence prevention control when the engine stall occurrence predicting unit has predicted occurrence of an engine stall, wherein the engine rotation speed increasing unit is configured to increase the engine rotation speed on the basis of the input shaft rotation speed detected by the input shaft rotation speed detecting unit on the condition that the accelerator operation amount that indicates that an accelerator pedal is released has been detected by the accelerator operation amount detecting unit, a fact that the vehicle is located on an inclined road surface has been detected by the inclination angle detecting unit and a travel of the vehicle in a direction opposite to a direction in which the vehicle travels by the transmitted driving force has been detected by the vehicle speed detecting unit, and the engine stall occurrence predicting unit is configured to predict occurrence of an engine stall on the basis of a rotation speed difference between the engine rotation speed increased by the engine rotation speed increasing unit and the detected input shaft rotation speed.

2. The control device according to claim 1, wherein the engine rotation speed increasing unit increases the engine rotation speed by executing idle speed control.

3. The control device according to claim 2, wherein the engine rotation speed increasing unit increases the engine rotation speed while a maximum engine rotation speed, to which the engine rotation speed is allowed to increase through the idle speed control, is set as an upper limit, and the engine stall occurrence predicting unit predicts occurrence of an engine stall on the basis of a rotation speed difference between the upper limit and the input shaft rotation speed.

4. The control device according to claim 1, wherein the engine rotation speed increasing unit increases the engine rotation speed such that the rotation speed difference between the input shaft rotation speed and the engine rotation speed is kept at a predetermined set value.

5. The control device according to claim 4, wherein the engine rotation speed increasing unit increases the set value as the inclination angle of the road surface, detected by the inclination angle detecting unit, increases.

6. The control device according to claim 1, wherein the prevention control unit prevents occurrence of an engine stall by outputting an alarm to a driver.

7. The control device according claim 1, wherein the prevention control unit prevents occurrence of an engine stall by controlling a brake device, which brakes the vehicle, such that the vehicle is braked.

8. A control method for a vehicle that transmits driving force from an internal combustion engine to a drive wheel via a transmission having a torque converter, comprising:
detecting an accelerator operation amount;
detecting an engine rotation speed of the internal combustion engine;
detecting a vehicle speed of the vehicle;
detecting an input shaft rotation speed of the transmission;
detecting an inclination angle of a road surface;
increasing the engine rotation speed on the basis of the detected input shaft rotation speed on the condition that the accelerator operation amount that indicates that an accelerator pedal is released has been detected, a fact that the vehicle is located on an inclined road surface has been detected and a travel of the vehicle in a direction opposite to a direction in which the vehicle travels by the transmitted driving force has been detected;
predicting occurrence of an engine stall on the basis of a rotation speed difference between the increased engine rotation speed and the detected input shaft rotation speed; and
executing engine stall occurrence prevention control when occurrence of an engine stall has been predicted.

9. The control method according to claim 8, wherein the engine rotation speed is increased by executing idle speed control.

10. The control method according to claim 9, wherein the engine rotation speed is increased while a maximum engine rotation speed, to which the engine rotation speed is allowed to increase through the idle speed control, is set as an upper limit, and occurrence of an engine stall is predicted on the basis of a rotation speed difference between the upper limit and the input shaft rotation speed.

11. The control method according claim 8, wherein the engine rotation speed is increased such that the rotation speed difference between the input shaft rotation speed and the engine rotation speed is kept at a predetermined set value.

12. The control method according to claim 11, wherein the set value is increased as the detected inclination angle of the road surface increases.

13. The control method according to claim 8, wherein occurrence of an engine stall is prevented by outputting an alarm to a driver.

14. The control method according to claim 8, wherein occurrence of an engine stall is prevented by controlling a brake device, which brakes the vehicle, such that the vehicle is braked.

* * * * *